(12) United States Patent
Levine et al.

(10) Patent No.: US 9,361,054 B2
(45) Date of Patent: Jun. 7, 2016

(54) VOICE AND TOUCH BASED MOBILE PRINT AND SCAN FRAMEWORK

(71) Applicant: Nuance Communications, Inc., Burlington, MA (US)

(72) Inventors: Mark A. Levine, Hampstead (CA); Allan Stratton, Wakefield, MA (US); Timothy J. Platt, Andover, MA (US); Richard S. Born, Fairport, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/290,658

(22) Filed: May 29, 2014

(65) Prior Publication Data

US 2015/0347067 A1 Dec. 3, 2015

(51) Int. Cl.
*G06F 3/12* (2006.01)
*G06F 21/60* (2013.01)

(52) U.S. Cl.
CPC ............ *G06F 3/1238* (2013.01); *G06F 3/1222* (2013.01); *G06F 3/1267* (2013.01); *G06F 3/1288* (2013.01); *G06F 21/60* (2013.01)

(58) Field of Classification Search
USPC ....................................................... 358/1.15
See application file for complete search history.

(56) References Cited

U.S. PATENT DOCUMENTS

2013/0080785 A1* 3/2013 Ruhlen .................... H04L 67/16
713/176
2013/0304604 A1* 11/2013 Hoffman ............ G06Q 30/0621
705/26.5

OTHER PUBLICATIONS

Loreto et al., Bidirectional HTTP, Apr. 2011, IETF, ISSN 2070-1721, All Pages.*
Xerox Mobile Print Cloud, Information Assurance Disclosure, Sep. 2012. http://www.xerox.com/download/security/informationassurance/befe64cdc5a5843900/cert_Mobile_Print_Information_Assurance_Disclosure_Paper_V1.3.pdf. Retrieved from internet May 29, 2014.
Google Cloud Print; http://www.google.com/cloudprint/learn/ Retrieved from internet May 29, 2014.
About Air Print; http://support.apple.com/kb/ht4356 Retrieved from internet May 29, 2014.

* cited by examiner

*Primary Examiner* — Ngon Nguyen
(74) *Attorney, Agent, or Firm* — Hamilton, Brook, Smith & Reynolds, P.C.

(57) ABSTRACT

Initiating document management in an enterprise network from outside of the network can challenge information technology (IT) specialists because many solutions require altering security of the enterprise network. In an embodiment, a method includes polling, from an automated agent in an agent-side network, a server in a cloud-side network for a request to access a document management resource of the agent-side network via an interface between the agent-side network and cloud-side network The method further includes, responsive to the polling, downloading the request via the interface between the agent-side network and the cloud-side network. The method additionally includes issuing the request to the document management resource to cause the document management resource to access a document stored on a device of the agent-side network and perform an operation associated with the request. The method, therefore, enables a user access to the document management resource from outside of an enterprise network.

20 Claims, 4 Drawing Sheets

VOICE AND TOUCH BASED MOBILE PRINT AND SCAN FRAMEWORK

BACKGROUND

Enterprise networks, protected by firewalls, offer document management solutions to authorized users. For example, a user can print a document from inside the enterprise network and optionally track the cost to a client indicated by the user. Inside the enterprise network, the cost of the printing can be tracked and attributed to the user who initiated the print. Other document operations can further be employed, such as scanning, copying, or faxing.

SUMMARY

In an embodiment, a method includes polling, from an automated agent in an agent-side network, a server in a cloud-side network for a request to access at least one document management resource of the agent-side network via an interface between the agent-side network and cloud-side network. The method further includes, responsive to the polling of the server, downloading the request via the interface between the agent-side network and the cloud-side network. The method additionally includes issuing the request to the at least one document management resource to cause the at least one document management resource to access a document stored on a device of the agent-side network and perform an operation associated with the request.

In an embodiment, the method can additionally include causing the at least one document management resource to perform at least one of printing a document, scanning the document, copying the document, faxing the document, loading the document, sending the document, emailing the document, and saving the document.

In an embodiment, the method can further include accessing a queue of the server, the queue having at least one entry populated with at least one user input from a device in the cloud-side network.

In an embodiment, the method can additionally include forwarding results of the operation from the automated agent of the request to the server via the interface. Forwarding the results from the automated agent to the server via the interface further can include at least one of generating, from the server, a second request based on the results, and sending, from the server, the results to be displayed on a user device.

In an embodiment, the method can additionally include authenticating the request to enable access to the at least one resource document management of the agent-side network. The authenticating may include dual-authenticating by performing a voice biometric authentication of a user and a password authentication of the user.

In an embodiment, the method can include managing the at least one document management resource of the agent-side network. The method can further include tracking use and cost recovery of the at least one document management resource of the agent-side network.

In an embodiment, the method can include registering the automated agent with the server via the interface.

In an embodiment, the method can include opening a time-restricted access channel via the interface or activating a time-restricted access period between the server and the automated agent.

In an embodiment, a method can include requesting access, from a device of a cloud-side network, to at least one document management resource of an agent-side network by notifying a server of the cloud-side network. The server can be configured to receive a polling request from an agent device of the agent-side network via an interface between the agent-side network and the cloud-side network of an existing application of the agent-side network, and be further configured to, responsive to the polling request, forward the request for the at least one document management resource to the automated agent via the interface, to cause the automated agent to enable execution of the request for the at least one document management resource to access a document stored on a device of the agent-side network and perform an operation associated with the request.

In an embodiment, the method can further include generating the access request at the device of the cloud-side network by receiving audio of a user of the device. The method can further include performing natural language understanding on the audio or forwarding the audio to the server, to cause the server to perform natural language understanding on the audio to generate the access request.

In an embodiment, the method can include, responsive to the automated agent's sending a result of the access request to the server, presenting the result of the access request, the result received from the server, to a user of the device.

In an embodiment, the method can further include presenting, on a touch screen of the device, one or more of the document management resources and document management operations for user selection. The method can further include generating the access request based on the user's input selecting the at least one document management resource and document management operations.

In an embodiment, a method can include storing, in a queue, at least one request to access a document management resource in an agent-side network, the at least one request received from a device over a cloud-side network. The method can further include, responsive to polling from an automated agent in the agent-side network, sending, via an interface between the agent-side network and the cloud-side network of an existing application of the agent-side network, the at least one requests, which are stored in the queue, to the automated agent to cause the automated agent to issue the request to the at least one document management resource. The request can cause the at least one document management resource to access a document stored on a device of the agent-side network and perform an operation associated with the request.

In an embodiment, executing the request includes causing the at least one document management resource to perform at least one of printing a document, scanning the document, copying the document, faxing the document, loading the document, sending the document, emailing the document, and saving the document.

In an embodiment, the method can further include receiving audio from a device of the cloud-side network. The method can further include performing natural language understanding on the audio to generate the request.

In an embodiment, the method can further include registering the automated agent with the server via the interface.

In an embodiment, the method can further include, responsive to receiving results of the request from the automated agent, generating a second request based on the results or forwarding the results to the device to be displayed to a user.

In an embodiment, the method can further include authenticating the request to access the at least one document management resource of the agent-side network. The authenticating may include dual-authenticating by performing a voice biometric authentication of a user and a password authentication of the user.

In an embodiment, the method can further include opening a time-restricted access channel via the interface or activating a time-restricted access period between the server and the automated agent.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Previous mobile printing solutions do not comprehensively solve the challenges of enterprise mobile cloud printing. In an embodiment, a print architecture of the present invention interfaces with enterprise (internal) user authentication systems, links multiple users to multiple devices, is available on mobile smart-phones via a cloud-side network (e.g., the public Internet), interfaces with any printer model from any vendor to provide selection of print attributes, provides mobile print and mobile release, tracks and controls printing, provides voice control/automation, and integrates with cost-recovery. Examples of print attributes include color depth, simplex, duplex, pages per sheet, paper tray selection, multiple paper tray selection, page ranges, finishing options (e.g., stapling, hole punching).

Figure 1:
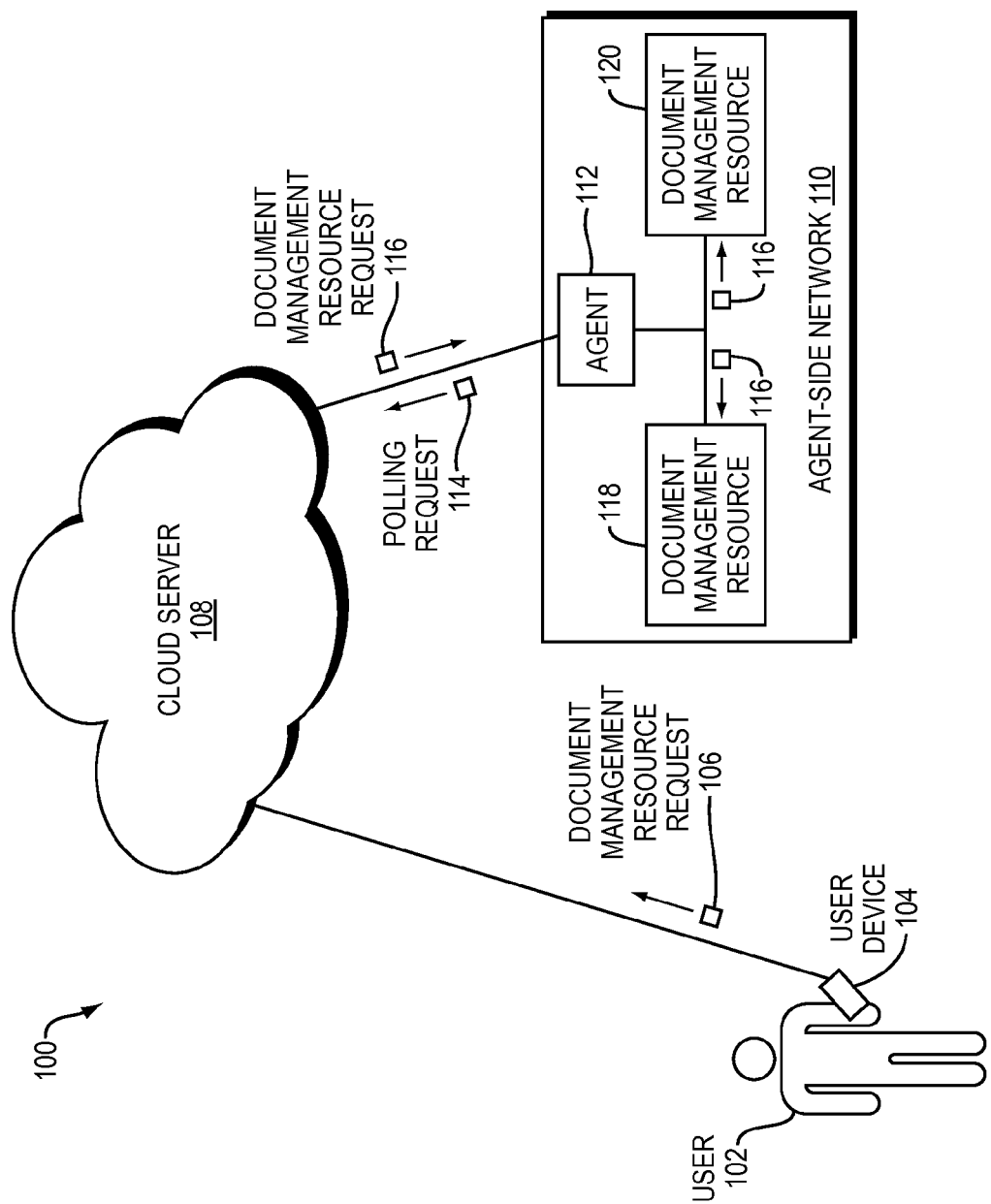
FIG. 1 is a block diagram illustrating an example embodiment of the present invention.

FIG. 1 is a block diagram 100 illustrating an example embodiment of the present invention. A user 102 controls a user device 104 (e.g., mobile device, desktop computer, etc.) equipped with a mobile print application of the present invention. The user 102 can enter a document management resource (DMR) request 106 to the user device 104 by a touch screen interface, other user interface, natural language understanding (NLU) interface, or a combination of user interfaces and NLU interfaces. The DMR request 106 can be a request for printing a document, scanning a document, copying a document, faxing a document, loading a document, sending a document, emailing a document, and saving a document. The document can be accessed from a document management system in an agent-side network 110 (e.g., an enterprise network) by providing authentication to the document management system and subsequently loading or saving the document. The agent-side network 110 is protected by a firewall relative to the user device 104.

The user device 104 sends the DMR request 106 to a cloud server 108 in a cloud-side network (e.g., the Internet). The cloud server 108 stores the DMR request 106 in a data structure such as a queue or a database.

An agent 112 of the agent-side network 110 then sends a periodic polling request 114 to the cloud server 108. In response, the cloud server 108 sends a DMR request 116 to the agent 112 of the agent-side network 110. The cloud server 108 sends the DMR request 116 to the agent 112 of the agent-side network 110 over a socket opened by the same interface used in polling the cloud server 108 from the agent 112 of the agent-side network 110. In this manner, an information technology (IT) manager of the agent-side network 110 does not have to open up any Uniform Resource Locators (URLs) or ports in a firewall or change security settings of the agent-side network 110 because the cloud server 108 simply responds to an outgoing request from the agent 112 instead of having an always-open port in the agent-side network 110 through which to send requests. The agent 112, on the inside of the agent-side network 110, can then distribute the DMR request 116 to DMRs 118 or 120 (e.g., printers, copiers, all-in-one machines, document storage resources, etc.). The DMRs 118 or 120 can then execute the request 116.

The DMR request 106 can be an "opaque" request. The cloud server 108 is agnostic to the DMR requested by the DMR request 106. The DMR request 106 is a packaging which the agent 112 can download from the cloud server 108 without opening a hole in the agent-side network 110 firewall. The agent 112, upon downloading the DMR request 116 from the cloud server 108 can then unpackage the DMR request 116 to determine which document management resource 118 or 120 the DMR request 116 is directed. The agent 112 can then either reformat the DMR request 116 in a correct format for the DMR 118 or 120, or if the DMR request 116 is already in a format to access the DMR 118 or 120, forward the unpackaged DMR request 116 to the DMRs 118 or 120.

Figure 2:
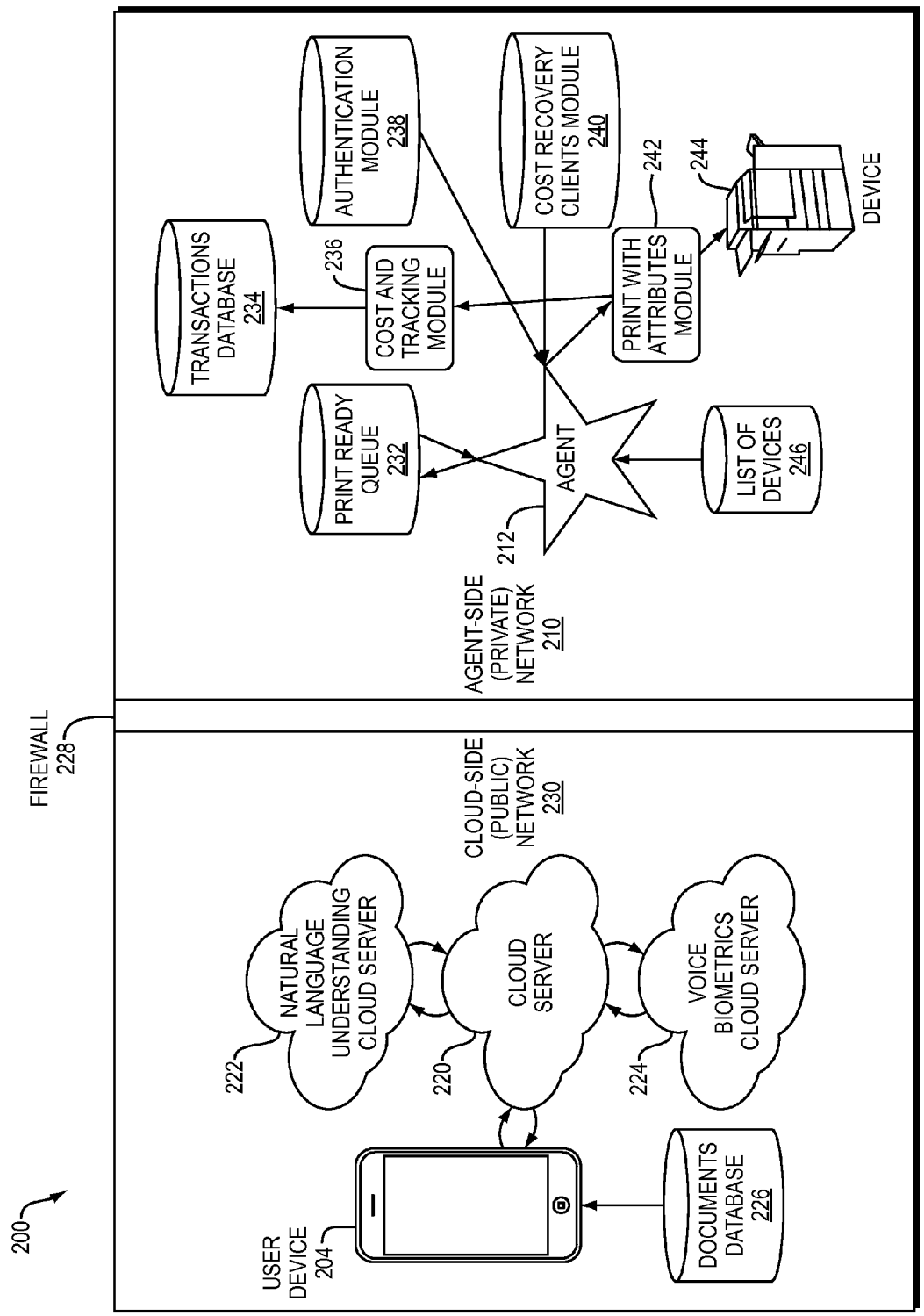
FIG. 2 is a block diagram illustrating an example embodiment of the present invention.

FIG. 2 is a block diagram 200 illustrating an example embodiment of the present invention. As described above, embodiments of the present invention enable access of a device 244 on an agent-side network 210 (e.g., an enterprise or private network) having a firewall 228 in a cloud-side network (e.g., a public network, the Internet) from a user device 204. The user device 204 receives user input to generate a DMR request. The user input to the user device 204 can be input to a touch screen, other user interface, natural language understanding (NLU), or a combination of inputs. The user input is sent to a cloud server 220 to generate the DMR request. If the user input includes a NLU request, the cloud server 220 can send the NLU portion of the user input to a NLU cloud server 222 to analyze the voice data and return appropriate data for the DMR request. If the NLU cloud server cannot determine information for the DMR request from the user input, it can return a request to the cloud server 200 to ask the user, from the user device 204, for clarification. The user device 204 can also communicate with the NLU cloud server 222 directly, instead of via the cloud server 220.

The user device 204 can also authenticate the user. The user can type in a password or passcode, or graphical pattern on the user device 204. The user device 204 can also authenticate the user by recording the user saying a password verbally, which is then authenticated at a voice biometrics cloud server 224. The voice biometrics cloud server 224 determines (1) whether the password is the correct password and (2) whether voice biometrics indicate that the person uttering the password is the correct person. This offers the user another layer of security for the user without adding additional login time. The user device 204 can communicate with the voice biometrics cloud server 224 directly, or via cloud server 220.

The user device 204 also indicates which document it wants to be in the DMR request. In an embodiment, the user can load a document from a documents database 226, thereby sending the data of the file to the cloud server 220. In other embodiments, the user device 204 can send a pointer or a location of a file on the agent-side network 210, where the user selects a document name from a list of documents, but the user device 204 may not have access to the document itself from the documents database 226. In an embodiment, the documents database 226 can be populated by a DMR request to the agent-side network 210 for a list of documents in a particular location or document management system and subsequent response sending the list or documents themselves to the user device 204 or documents database 226.

An agent 212 of the agent-side network 210 receives the DMR request. The agent 212 is operatively coupled to a print ready queue 232, a list of devices 246, a print with attributes module 242, an authentication module 238, and a cost recovery clients module 240. Upon receiving a DMR request, the agent 212 can analyze and unpackage the DMR request and store it in the print ready queue 232. The agent 212 can further access the print with attributes module 242 to determine whether the requested device 244 (e.g., printer) is available for a new job. If so, the agent 212 can pop the item from the print ready queue 232 and send it to the device 244. In another embodiment, each device 244 of the agent-side network can have its own print ready queue 232. Further, the agent 212 can bypass the print ready queue 232 by determining the device 244 is ready to receive print jobs and sending the job to the print with attributes module 242 directly.

The print with attributes module 242 is also operatively coupled with a cost and tracking module 236. The cost and tracking module 236 tracks and calculates cost of each job executed at each device. Such calculations are stored in a transactions database 234. A cost recovery clients module 240, coupled to the agent 212, can use the data of the transactions database 234 combined with client information for each job to assign costs to clients or other third parties.

An authentication module 238 is coupled with the agent 212 to provide authentication details to each user. Authentication 238 determines whether the user is authorized to print to a given device 244.

Figure 3:
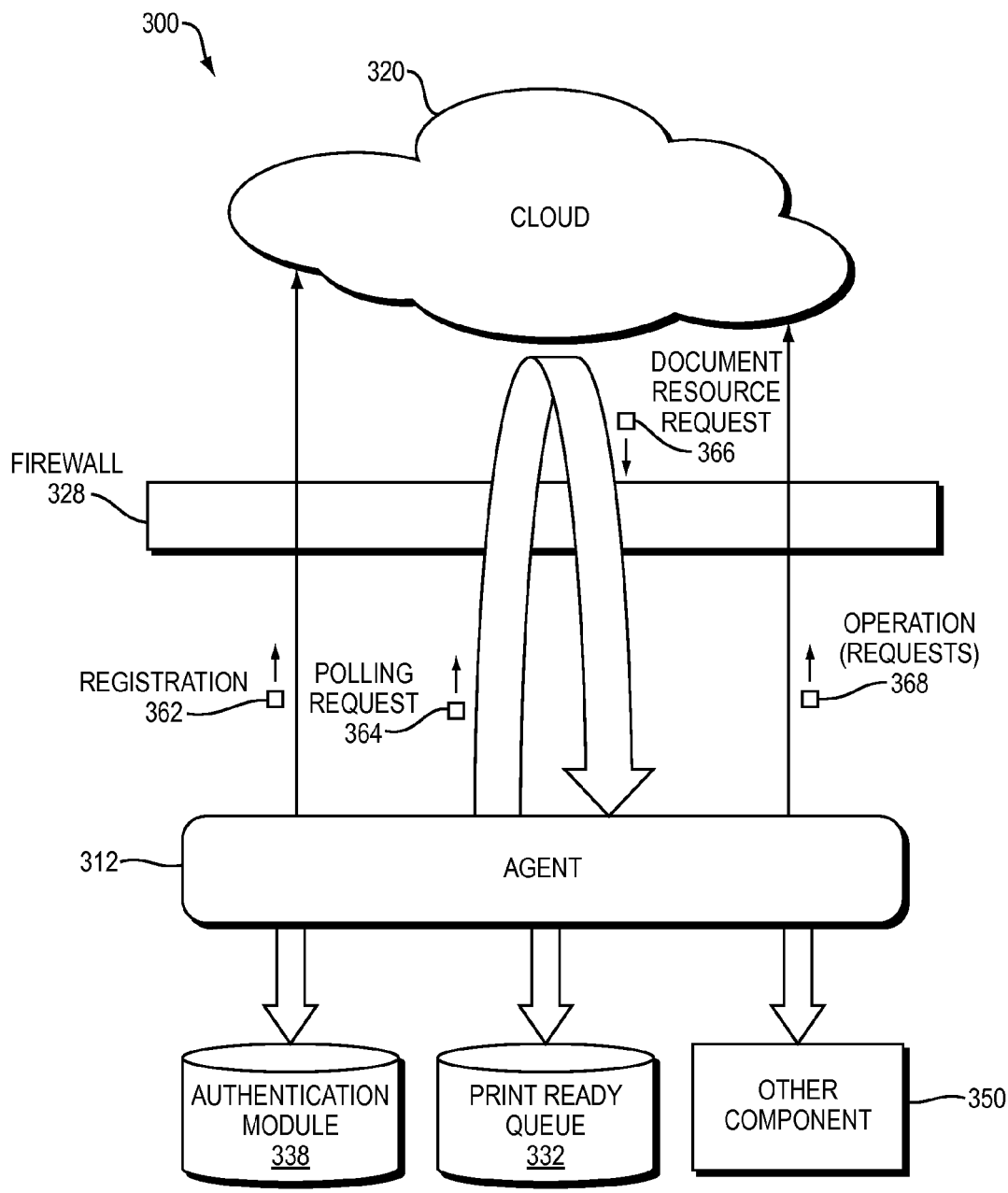
FIG. 3 is a block diagram illustrating an example embodiment of the present invention.

FIG. 3 is a block diagram 300 illustrating an example embodiment of the present invention. An agent 312 first issues a registration 362 to a cloud 320 on an opposite side of a firewall 328. The agent 312 can communicate with the cloud 320 through the firewall 328 because the agent initiates the communication, so a hole does not need to be opened in the firewall 328. The cloud 320 can return with a response to the agent 312 that registration is successful. After registration, the agent can issue polling requests 364 to the cloud 320 through the firewall 328. The cloud 320 determines whether it has any jobs for the agent 312, and if so, sends at least one document resource request 366. The agent can periodically re-issue the polling request 364 to check for additional document resource requests 366. The agent 312 can be configured to issue the polling request 364 at any customizable interval, or manually.

Upon receiving the document resource request 366 from the cloud 320, the agent 312 determines whether the document resource request 366 is from an authenticated user by comparing it to entries in an authentication module 338. Then, the agent 312 sends a document resource request to the print ready queue 332 to be sent to resources, as described in relation to FIG. 2. The agent 312 can further forward the document resource request 366 to other components 350, such as a cost tracking module, or a non-printing resource, like a document management resource for loading and saving files on a network.

Figure 4:
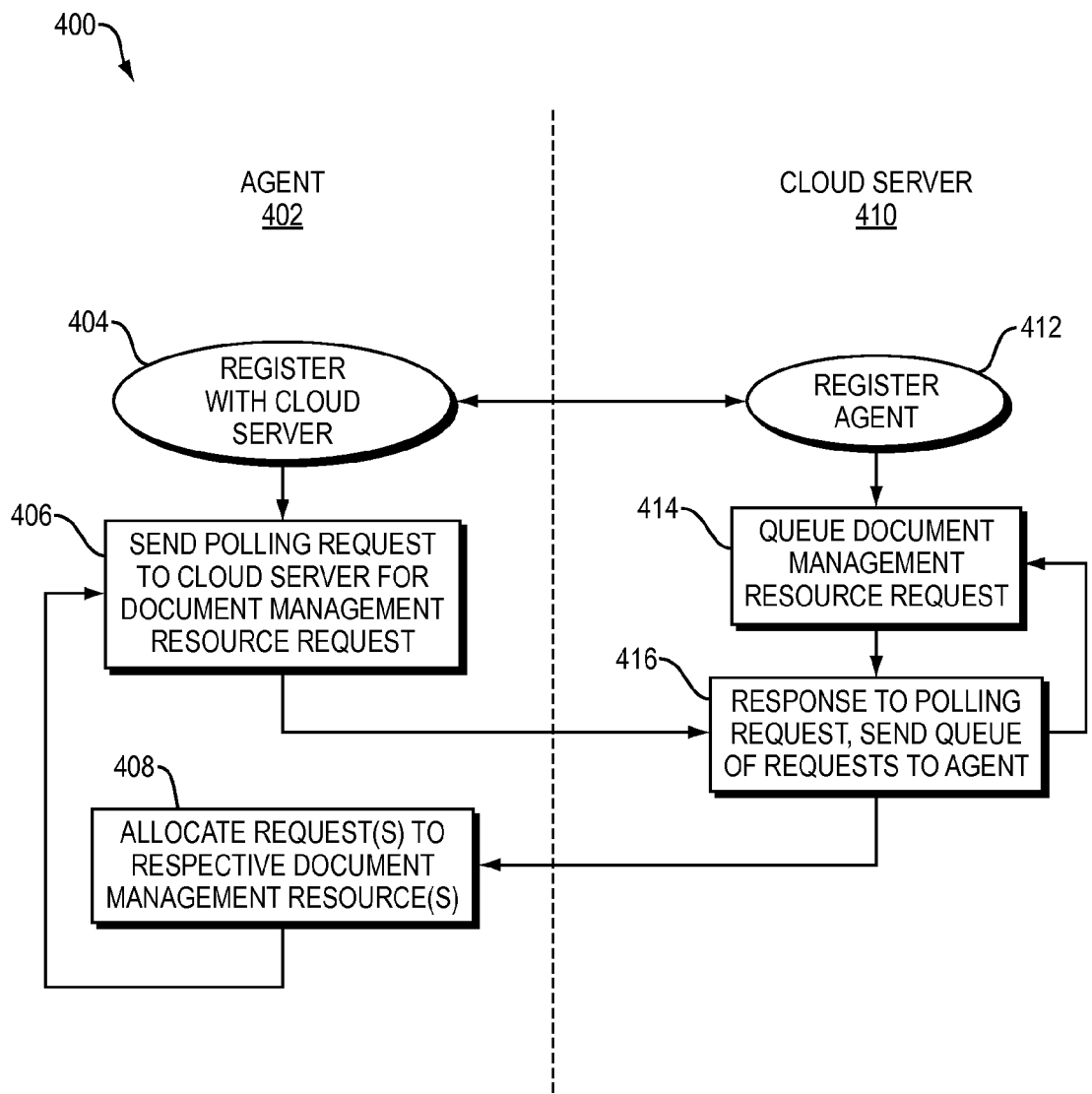
FIG. 4 is a flow diagram illustrating an example embodiment of a process employed by an agent and cloud server.

FIG. 4 is a flow diagram illustrating an example embodiment of a process employed by an agent 402 and cloud server 410. The agent 402 registers with a cloud server 410 (404) and in response, the cloud server 410 registers the agent (412). The agent then sends a polling request to the cloud server for a document management resource request (406). Meanwhile, the cloud server 410 queues document management resource requests sent from a user device (414). Then, responsive to the polling request, the cloud server 410 sends the queue of requests to the agent 402 (416). The agent 402 then allocates request(s) to respective document management resource(s) (408).

In an embodiment of the present invention, a system provides an agent that is the "middleware" between a cloud server and an enterprise print management and authentication systems. Mobile and/or desktop users can communicate document management requests to the cloud (e.g., a cloud server). The enterprise print manager communicates with the Agent, not directly with the cloud nor directly with the mobile devices.

The agent brokers requests from the cloud (and indirectly from the user) and requests back to the cloud (and indirectly to the user). The agent therefore facilitates linking mobile devices to a private network, authenticating users on the enterprise's authentication system, accessing a list of available enterprise printers, uploading new documents and accessing previously uploaded documents, converting documents to a universal print-ready format, printing documents on any device, tracking all print usage, and limiting and controlling usage.

After installation on an enterprise network, the agent automatically registers with the cloud server. The agent begins receiving document resource requests (e.g., provide a list of all printers) from the cloud server by the agent's polling the cloud server and the cloud server's responding to the polling request with the document resource request. The requests can be made using HTTPS and the Representational State Transfer (REST) protocol. The agent polling the cloud server eliminates the need to open additional URLs (e.g., endpoints or ports) from within the firewall to the public internet. IT managers can implement the system of the present invention easier with fewer security concerns. The agent handles all communications with other enterprise components.

A document available at a mobile device, whether it comes from email, the web, or the mobile application, can be transferred to the Cloud server (or subsequently the agent) via the mobile application. The cloud server may hold the request in a queue or send it to the agent to be printed/acted upon. Prior to using the mobile application, a user is authenticated using the same credentials used to print internal to the enterprise network. Document activity can be tracked according to multiple print attributes and the tracking can be stored in a transaction database. A user may print or release documents with print attributes such as color or black and white, duplex, paper tray, or page range for any printer.

The agent of the present invention further is able to record cost and transactions for all printing activity based on the print attributes. The agent is further able to extend the mobile device's human interface by employing a Natural Language Understanding (NLU) Interface. The agent further can add authentication by employing voice biometrics. The agent can further charge back printing activity to a $3^{rd}$ party.

NLU allows a user to mix voice and touch to use a single uninterrupted utterance to trigger an entire printing process including attributes. For example, the user can say "print three copies in color and double sided on my Xerox Printer that I call Big-Guy of the last 3 documents from DropBox®." The agent can also mix useful utterances with touch activity to select the printer and documents and then say "print three copies in black and white on the bottom tray." The agent can also use a conversational exchange:

User: "Print."
Agent Prompt: "Which documents?"
User: "All of them."
Agent Prompt: "On Which Device?"
User: "My default printer."
Agent Prompt: "Would you like any special attributes?"
User: "Yes, just pages 3 to 7."
Agent Prompt: "Say Go to confirm."
User: "Go."

All Voice Requests are streamed to a voice cloud and converted to text using an Extensible Markup Language (XML) based grammar. Furthermore, the grammar(s) parse sentence fragments into meaningful containers called "agents." Each set of related agents are grouped together in an "agency." All necessary agencies to fulfill a complete task are grouped into the conversation. Grammars, agents and agencies combined with state-aware graphical user interface (GUI) logic resolve ambiguous voice commands into meaningful actions. For example, the command "print two copies of the first two" works when documents are in view on the device. Otherwise, the device prompts for clarification.

One challenge with NLU systems is taking a customer supplied list of items, such as contact lists or document names, and making them available to be spoken and understood by current NLU Grammars. The agent provides a list phonetic cleanser to solve the issue. Take, for example, the Document Title "AXE!13-2013.doc". How should a system understand what a user may say to identify this document? The agent resolves this problem with a number of enhancements. First, in one embodiment, the agent removes the file extension (e.g., reduces the example file name to "AXE!13-2013"). Then, the agent replaces any non-alphanumeric or space with a space (e.g., "AXE 13 2013"). If two capital letters are adjacent, the agent separates them with a space (e.g., "A X E 13 2013"). Then, the agent adds a space after any number (e.g., "A X E 1 3 2 0 1 3"). The agent then removes trailing spaces or more than one consecutive space, to give a final result of "A X E 1 3 2 0 1 3". The user can identify the title by voice by saying each letter and number. The user can phonetically say "Ay Ex Ee one three two oh one three" to identify the file.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
by a hardware processor:
polling, from an automated agent in an agent-side network, a server in a cloud-side network outside of the agent-side network for a request message to access at least one document management resource of the agent-side network via an interface between the agent-side network and cloud-side network, the request message originating in the cloud-side network;
responsive to the polling of the server, downloading the request message via the interface between the agent-side network and the cloud-side network; and
issuing the request message to the at least one document management resource to cause the at least one document management resource to access a document stored on a device of the agent-side network and perform an operation associated with the request message.

2. The method of claim 1, further comprising causing the at least one document management resource to perform at least one of printing a document, scanning the document, copying the document, faxing the document, loading the document, sending the document, emailing the document, and saving the document.

3. The method of claim 1, further comprising accessing a queue of the server, the queue having at least one entry populated with at least one user input from a device in the cloud-side network.

4. The method of claim 1, further comprising forwarding results of the operation from the automated agent of the request message to the server via the interface.

5. The method of claim 4, wherein forwarding the results from the automated agent to the server via the interface further includes at least one of:
generating, from the server, a second request message based on the results, and
sending, from the server, the results to be displayed on a user device.

6. The method of claim 1, further comprising authenticating the request message to enable access to the at least one resource document management of the agent-side network, the authenticating including dual-authenticating by performing a voice biometric authentication of a user and a password authentication of the user.

7. The method of claim 1, further comprising:
managing the at least one document management resource of the agent-side network; and
tracking use and cost recovery of the at least one document management resource of the agent-side network.

8. The method of claim 1, further comprising:
registering the automated agent with the server via the interface.

9. The method of claim 1, further comprising opening a time-restricted access channel via the interface or activating a time-restricted access period between the server and the automated agent.

10. A method comprising:
by a hardware processor:
requesting access, from a device of a cloud-side network outside of an agent-side network, to at least one document management resource of the agent-side network by notifying a server of the cloud-side network, the server being configured to receive a polling request message from an agent device of the agent-side network via an interface between the agent-side network and the cloud-side network of an existing application of the agent-side network, and, the server being further configured to, responsive to the polling request message, forward the access request message for the at least one document management resource to an automated agent via the interface, to cause the automated agent to enable execution of the access request message for the at least one document management resource to access a document stored on a device of the agent-side network and perform an operation associated with the access request message.

11. The method of claim 10, further comprising:
generating the access request message at the device of the cloud-side network by receiving audio of a user of the device; and
performing natural language understanding on the audio or forwarding the audio to the server, to cause the server to perform natural language understanding on the audio to generate the access request message.

12. The method of claim 10, further comprising:
responsive to the automated agent's sending a result of the access request message to the server, presenting the result of the access request message, the result received from the server, to a user of the device.

13. The method of claim 10, further comprising:
presenting, on a touch screen of the device, one or more of the document management resources and document management operations for user selection;
generating the access request message based on the user's input selecting the at least one document management resource and document management operations.

14. A method comprising:
by a hardware processor:
storing, in a queue, at least one request message to access a document management resource in an agent-side network, the at least one request message received from a device over a cloud-side network outside of the agent-side network;
responsive to polling from an automated agent in the agent-side network, sending, via an interface between the agent-side network and the cloud-side network of an existing application of the agent-side network, the at least one request message stored in the queue to the automated agent to cause the automated agent to issue the request message to the at least one document management resource, the request message causing the at least one document management resource to access a document stored on a device of the agent-side network and perform an operation associated with the request message.

15. The method of claim 14, wherein executing the request message includes causing the at least one document management resource to perform at least one of printing a document, scanning the document, copying the document, faxing the document, loading the document, sending the document, emailing the document, and saving the document.

16. The method of claim 14, further comprising:
receiving audio from a device of the cloud-side network; and
performing natural language understanding on the audio to generate the request message.

17. The method of claim 14, further comprising:
registering the automated agent with the server via the existing interface.

18. The method of claim 14, further comprising:
responsive to receiving results of the request message from the automated agent, generating a second request message based on the results or forwarding the results to the device to be displayed to a user.

19. The method of claim 14, further comprising authenticating the request message to access the at least one document management resource of the agent-side network, the authenticating including dual-authenticating by performing a voice biometric authentication of a user and a password authentication of the user.

20. The method of claim 14, further comprising opening a time-restricted access channel via the interface or activating a time-restricted access period between the server and the automated agent.

* * * * *